US009020462B2

(12) United States Patent
Hodgson et al.

(10) Patent No.: US 9,020,462 B2
(45) Date of Patent: Apr. 28, 2015

(54) ENHANCED HANDLING OF DURESS SITUATIONS

(75) Inventors: John Hodgson, Ottawa (CA); Nicholas Bryson Wilson, Ottawa (CA)

(73) Assignee: BlackBerry Limited, Waterloo, CA (US)

( * ) Notice: Subject to any disclaimer, the term of this patent is extended or adjusted under 35 U.S.C. 154(b) by 1551 days.

(21) Appl. No.: 11/685,363

(22) Filed: Mar. 13, 2007

(65) Prior Publication Data

US 2008/0227429 A1 Sep. 18, 2008

(51) Int. Cl.
H04M 11/04 (2006.01)
H04W 24/00 (2009.01)
H04M 3/16 (2006.01)
H04M 1/725 (2006.01)

(52) U.S. Cl.
CPC .......... *H04M 11/04* (2013.01); *H04M 1/72538* (2013.01); *H04M 1/72547* (2013.01); *H04M 2250/10* (2013.01)

(58) Field of Classification Search
USPC ................ 455/404.1–404.2, 410–411, 412.2, 455/418–420, 456.1–457, 466; 340/426.1, 340/426.18–426.2, 8.1; 379/37–44; 380/247, 255; 713/150, 182, 187, 189, 713/194; 726/1–23, 26–30
See application file for complete search history.

(56) References Cited

U.S. PATENT DOCUMENTS 6,088,796 A * 7/2000 Cianfrocca et al. ........... 713/152
6,195,000 B1 * 2/2001 Smith et al. .................. 340/471
7,251,471 B2 7/2007 Boiling
7,433,672 B2 10/2008 Wood
2004/0185824 A1 * 9/2004 Cheng ......................... 455/404.2
2004/0203617 A1 * 10/2004 Knauerhase et al. ....... 455/412.1
2005/0064856 A1 * 3/2005 Atkin et al. .................. 455/418
2005/0085257 A1 * 4/2005 Laird et al. ................ 455/550.1
2005/0162267 A1 * 7/2005 Khandelwal et al. ......... 340/506
2005/0197142 A1 * 9/2005 Major ........................... 455/466

(Continued)

FOREIGN PATENT DOCUMENTS

GB 2 401 752 A 11/2004
GB 2 419 783 A 5/2006
GB 2419783 A 5/2006

OTHER PUBLICATIONS

Office Action issued on corresponding Canadian Application No. 2,624,207 dated Dec. 23, 2010.

(Continued)

*Primary Examiner* — Michael Mapa
(74) *Attorney, Agent, or Firm* — Moffat & Co.

(57) ABSTRACT

A wireless communications device can be triggered by a user in a duress situation to provide to a predetermined recipient, or to a monitoring service, a duress message containing emergency-response information, such as GPS coordinates, a photograph and/or an audio clip to facilitate an emergency response to the duress situation. The wireless device can periodically send follow-up duress messages to provide updated GPS data, photos or other information. The wireless device monitoring can also reply to specific queries from the monitoring service to provide requested information that would be most useful to the recipient attempting to coordinate an emergency response. In the event that the device is outside data packet coverage, the duress message can be transmitted using an alternate mode of communication such as SMS or MMS. If no mode of communication is available, the device stores the duress message until communications are possible.

15 Claims, 5 Drawing Sheets

(56) References Cited

U.S. PATENT DOCUMENTS

| | | | |
|---|---|---|---|
| 2005/0272443 A1* | 12/2005 | Hose et al. | 455/456.1 |
| 2005/0282541 A1* | 12/2005 | Iizuka et al. | 455/426.2 |
| 2005/0287980 A1* | 12/2005 | Wood | 455/404.1 |
| 2006/0025121 A1* | 2/2006 | Bumiller | 455/418 |
| 2007/0167688 A1* | 7/2007 | Ross et al. | 600/300 |
| 2007/0200716 A1 | 8/2007 | Haase | |

OTHER PUBLICATIONS

Office Action issued on corresponding Canadian Application No. 2,624,207 dated Jun. 10, 2009.

* cited by examiner

ENHANCED HANDLING OF DURESS SITUATIONS

TECHNICAL FIELD

The present technology relates generally to wireless communications and, in particular, to wireless devices configured to handle duress situations.

BACKGROUND

Some handheld wireless communications devices, such as the BlackBerry® by Research in Motion Limited, are configured to enable a user to send out an emergency message in a duress situation. If a user is under duress and being forced to unlock the handheld device, the user merely has to enter a modified password to trigger the sending of an e-mail message to a predetermined duress notification address, which is either a single e-mail address of a desired recipient or a distribution list (as determined by a configurable duress notification policy). The modified password can simply be a variation of the usual password, such as, for example, transposing the first character to the end of the password.

As a safety feature, as is the case with current BlackBerry® models, the handheld device does not save a copy in the sent messages in the list, nor does it show the network communication arrows when sending.

In order to satisfy an increasingly security-conscious population, further improvements and refinements to this basic technology remain highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DESCRIPTION

Figure 1:
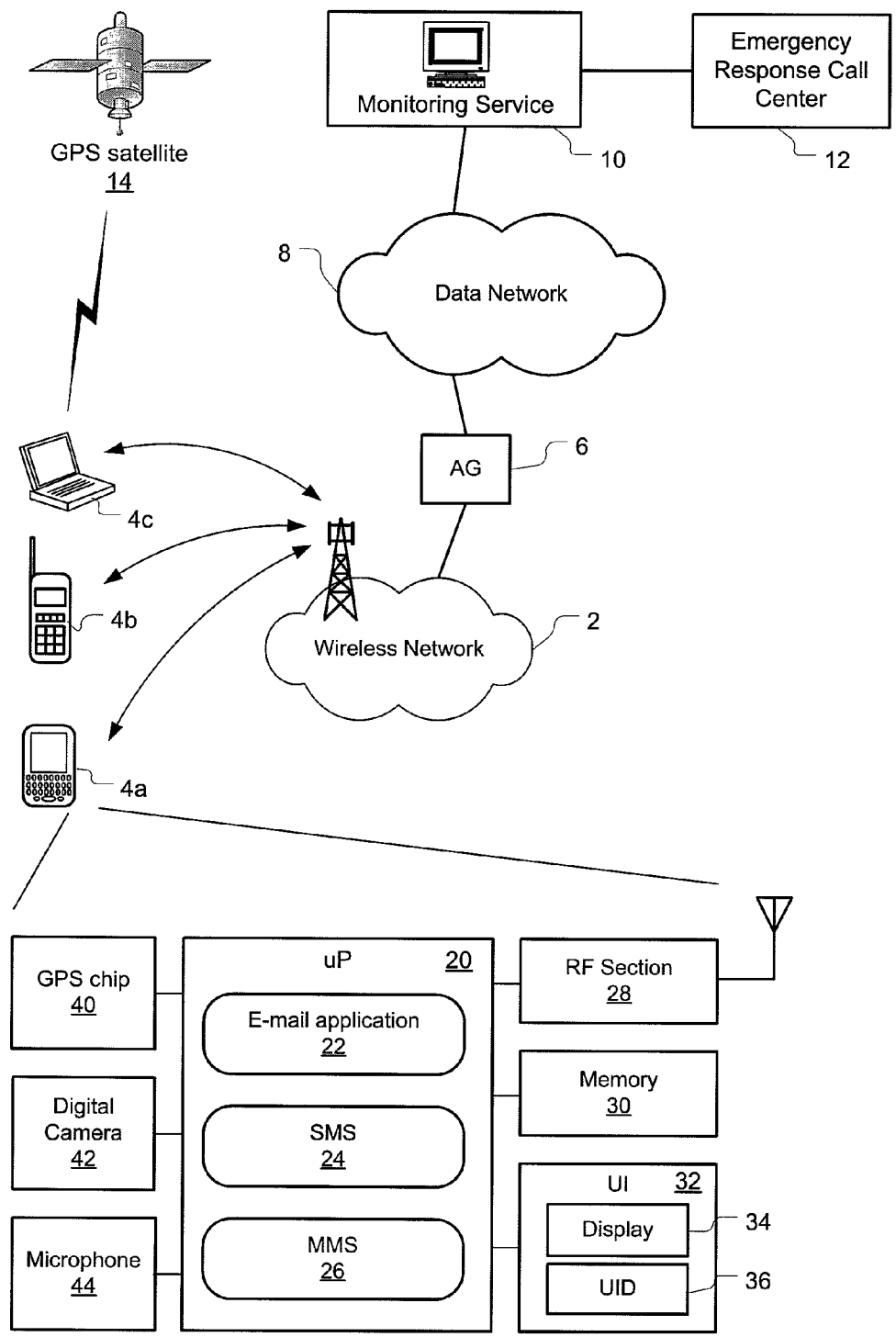
FIG. 1 is a schematic illustration of a system for monitoring communications from wireless devices to provide an emergency response to a user in a duress situation in accordance with an aspect of the present technology.

The present technology improves the handling of a duress situation experienced by a user of a wireless communications device. The present technology is directed to improvements in the manner in which the wireless device responds when the user triggers the generation and transmission of a duress message.

In general, the device is enabled to provide emergency-response information about the environment in which the device is situated when the user triggers the generation and transmission of a duress message to a predetermined recipient. The duress message contains emergency-response information such as, for example, GPS data that would indicate to the recipient where the device is currently situated, a digital photograph taken surreptitiously (i.e. silently and invisibly) that might provide a clue to the recipient as to the location of the device or the identity of the user's assailant. The emergency-response information could also contain an audio clip that might provide a voice print of the assailant. The wireless device can also provide updated information by periodically transmitting follow-up duress messages.

If the wireless device is outside of data packet coverage, then the device could attempt to transmit the duress message using an alternate mode of communication, such as SMS or MMS. If no mode of communication is available, then the wireless device will store the duress message until its ability to communicate is restored.

In response to the duress message, a monitoring service can query the wireless device for specific information that would be particularly useful to the recipient in coordinating an emergency response to the duress situation. Thus, the wireless device and monitoring service can be considered to be engaging in a "duress conversation".

Thus, an aspect of the present technology provides a method of handling a duress situation experienced by a user of a wireless device. The method includes steps of enabling the user to trigger the wireless device to automatically generate a duress message for alerting a predetermined recipient that the user is in a duress situation, capturing emergency-response information about the environment in which the device is situated, automatically incorporating the emergency-response information into the duress message, and automatically transmitting the duress message to the recipient.

Another aspect of the present technology provides a system for monitoring communications from wireless devices to provide emergency responses to users in duress situations. The system includes a wireless device configured for enhanced handling of duress situations. The wireless device has an input device for enabling the user to automatically generate a duress message for alerting a predetermined recipient that the user is in a duress situation, a processor for directing the device to capture emergency-response information about the environment in which the device is situated and for instructing an e-mail application executing on the device to automatically incorporate the emergency-response information into the duress message and automatically transmit the duress message to the recipient. The system further includes a monitoring service hosted on a server for monitoring communications from the wireless device and configured to identify an incoming duress message transmitted by the wireless device.

Yet another aspect of the present technology provides a wireless communications device for communicating emergency-response information when a user of the device is under duress. The wireless device includes an input device for enabling the user to trigger the wireless device to automatically generate a duress message for alerting a predetermined recipient that the user is in a duress situation and a processor for directing the device to capture emergency-response information about the environment in which the device is situated and for instructing an e-mail application to automatically incorporate the emergency-response information into the duress message and automatically transmit the duress message to the recipient.

FIG. 1 schematically illustrates a system for monitoring communications from wireless devices to provide emergency responses to users in duress situations. As depicted in FIG. 1, a wireless network 2 hosts a plurality of wireless devices including, by way of example only, a handheld wireless communications device 4a (such as the BlackBerry™ by Research in Motion Limited) having voice and data capabilities (for both e-mail, web browsing and the like) as well as a full or reduced QWERTY keyboard, a cell phone 4b, or a wireless-enabled laptop computer 4c.

As shown in FIG. 1, these wireless devices 4a-4c can access data services hosted on a data network 8 (e.g. the Internet) via an applications gateway (AG) 6 which mediates data flow between the wireless network and the data network. As further illustrated in FIG. 1, a monitoring service 10 (or other message recipient) is connected to the data network to receive duress messages from one or more users of the wireless devices 4a-4c, as will be elaborated below. Upon receipt of a duress message, the monitoring service 10 (or other designated recipient) can contact an emergency-response call center (e.g. a 911 call center, typically by a voice call) in order to coordinate an emergency response to the duress message.

FIG. 1 schematically illustrates the pertinent components of the wireless communications device 4a which enable the device to capture and communicate emergency-response information when a user of the device is under duress. As shown in FIG. 1, the wireless communications device has a microprocessor ("processor") 20 for executing various applications such as an e-mail application 22, a Short Message Service (SMS) module 24 and/or a Multimedia Message Service (MMS) module 26. The wireless communications device 4a also includes a RF section 28 for wireless communication with a base station of the wireless network 2. The wireless communications device 4a further includes a memory 30 (both volatile and non-volatile) and a user interface 32 having both a display (i.e. a graphical user interface) 34 and a user input device 36. The input device, e.g. a QWERTY keypad or an alphanumeric phone keypad, enables the user to trigger the wireless communications device to automatically generate a duress message for alerting a predetermined recipient that the user is in a duress situation.

Triggering the automatic generation and transmission of the duress message can be accomplished by inputting a modified version of the user's password for unlocking the device. For example, the modified password can be the usual password with the first letter transposed to the end of the password. Alternatively, the user can customize the device to recognize any other duress password or appropriate input which signifies a duress situation.

For the purposes of this specification, "duress situation" means a situation in which the user of the wireless device is being threatened or coerced, possibly into unlocking the wireless device by entering the user's password.

When the user triggers the device to signal a duress situation, the processor 20 of the wireless device directs the wireless device to capture emergency-response information about the environment in which the device is situated and then instructs the e-mail application 22 to automatically incorporate the emergency-response information into the duress message and automatically transmit the duress message to the predetermined recipient (such as the monitoring service 10).

The "environment" may include such information as the location, position and surroundings of the wireless device. Therefore, "emergency-response information" can include visual data (e.g. one or more photos or a video clip) of the environment or surroundings as well as sound data (e.g. digitized audio clips) of the environment/surroundings. Emergency-response information can also include GPS data of the device's position derived using an onboard GPS chip 40 that can receive and use GPS signals from 3 or 4 GPS satellites 14. Alternatively, any GPS device is suitable to receive GPS signals from GPS satellites 14, such as an external GPS puck. The GPS data (coordinates) can then be readily converted by the recipient using any one of a number of mapping applications which convert GPS coordinates of longitude and latitude into a map location. Therefore, the GPS data (when converted or mapped) provides the recipient (or monitoring service 10) with the exact location of the device.

The wireless communications device can also include an embedded digital camera 42 for surreptitiously (i.e. silently and invisibly) taking one or more digital photographs of the environment. The digital photograph(s) can be transmitted as part of the duress message to the recipient to potentially provide visual clues as to the identity of the assailant and/or as to the location of the device (i.e. the recipient may be able to recognize a landmark or a distinctive geographical or urban feature that would help identify where the device is located, or the recipient may at least be able to discern, from the lighting and background details, whether the device is inside a building, outside on a busy street corner, in a park, in an alleyway, etc.)

In another embodiment, the wireless communications device 4a could capture a video clip for transmission to the recipient. However, due to limited wireless bandwidth, it is preferable to transmit periodic photos rather than an entire video clip to ensure that the duress messages are received without error or delay.

The wireless communications device 4a could further include a microphone 44 for capturing a digital audio clip. The microphone 44 can be part of the device's onboard phone or a separate microphone can be embedded within the device. The audio clip could potentially provide useful information about the environment or about the identity of the assailant (a voice print), the nature of the assault, the status of the user, etc. Where the duress message incorporates both GPS data and a photo (and possibly also an audio clip), this emergency-response information can prove very useful for the recipient in coordinating an intelligent and effective emergency response to the duress situation.

As noted above, the digital camera 42 embedded in the wireless device should "surreptitiously" (silently and invisibly) capture the digital picture, i.e. without the assailant noticing. Surreptitious photography requires that the wireless device suppress and disable all device functionalities that make clicking sounds, set off flashes, activate red-eye features, cause LEDs to blink or icons to materialize or anything that would otherwise tip off an assailant that a photograph is being, or has been, taken. The processor in the wireless communications device is thus configured to put the camera in "duress mode". In other words, the processor instructs the digital camera to disable the camera flash, red-eye, LEDs, icons, and all visual indicators that would indicate that a digital photograph is being taken.

In a variant, the processor of the wireless communications device can be configured to instruct the digital camera to photograph at low resolution in order to facilitate data transmission over the bandwidth-limited wireless channel. Alternatively, the processor can be configured to execute a data compression algorithm for compressing the digital photograph prior to transmission, again to ensure prompt data packet transmission over the wireless channel.

In a preferred embodiment, the wireless communications device transmits the duress message(s) over a data packet network as its primary (or default) communications channel. Although e-mail is the preferred mode of communication for data packet duress messages, other modes of communication can be designated or configured as the primary mode, such as a TCP/IP-type data conversation. However, if the wireless device is outside data packet coverage and thus the device cannot immediately transmit an e-mail duress message, the wireless device (provided it is equipped with a Short Message Service (SMS) module) can send the duress message using SMS as an alternate mode of transmitting the duress message, in which case only text data would be transmitted (i.e. no digital photos). Alternatively or additionally, the wireless communications device could have a Multimedia Message Service (MMS) module as an alternate mode of transmitting the duress message, in which case text, photo, video and audio data could also be transmitted. Preferably, the wireless communications device has both MMS and SMS modules so that it can attempt to use one or the other as alternate modes of transmitting the duress message. The wireless communications device could also be enabled to communicate via a satellite link, or even using short-range RF technologies like Bluetooth or by any other alternate mode of communication available to the device.

If no mode of communication is available to immediately transmit the duress message, the wireless communications device will locally store the duress message in the memory 30 until the ability to communicate using at least one mode of communication is restored. In this embodiment, the processor 20 in the wireless device is configured to direct the e-mail application 22 to "surreptitiously" store the duress message by temporarily storing the duress message in the memory 30 of the wireless device while the wireless device is unable to communicate. The device should preferably store the "non-sendable" messages in non-volatile memory as a countermeasure in case the assailant tries to remove the device's battery.

Figure 2:
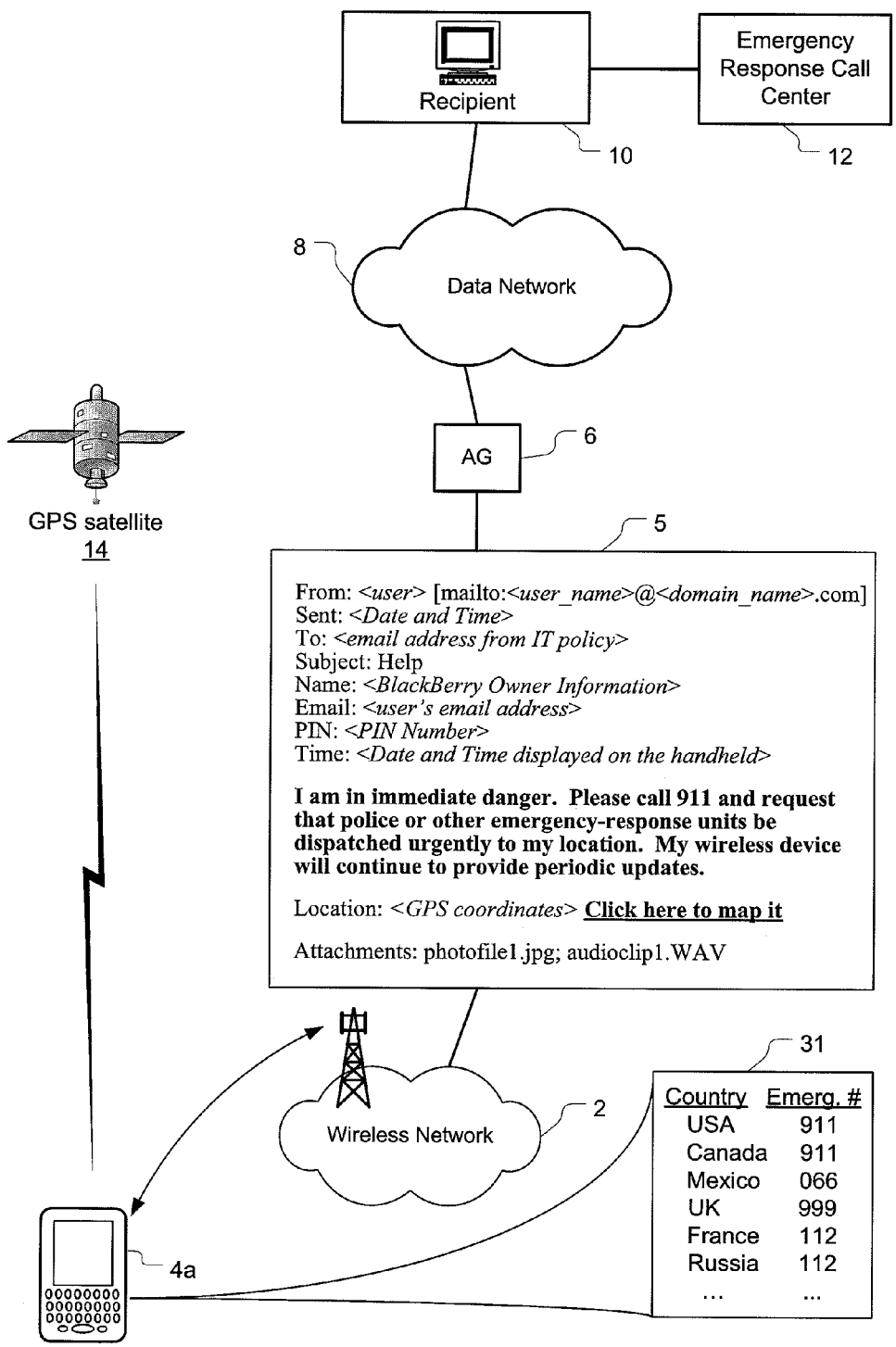
FIG. 2 is a schematic illustration of the transmission of a duress message incorporating GPS data, a digital photograph and a digitized audio clip in accordance with an embodiment of the present technology.

As depicted schematically in FIG. 2, the wireless communications device 4a sends a duress message 5 having, in one specific embodiment, the header format and content as shown. In this embodiment, the duress message contains GPS coordinates and a hyperlink to a mapping application that enables the recipient to quickly convert the GPS data into a position on a map. In this embodiment, the duress message 5 also contains attachments, namely a digital photograph (e.g. photofile1.jpg) and a digital audio clip (e.g. audioclip1.WAV). These file formats are merely meant to serve as examples; other formats could of course be employed. In this particular embodiment, the duress message 5 contains a subject line that reads "Help" (although this could be customized by the user to say something else) and a message content could read, for example, "I am in immediate danger. Please call 911 and request that police or other emergency-response units be dispatched urgently to my location. My wireless device will continue to provide periodic updates." As is known in the art, some networks include the emergency number as part of a network selection information packet, thus providing the device with the desired emergency contact number. Alternatively, or as back-up for those networks that do not offer this feature, the device can determine the number on its own, i.e. based on GPS coordinates and/or the identity of the wireless network hosting the device. In other words, the wireless communications device can determine which country it is currently in and can then look up the emergency-response number corresponding to that country in an emergency number database 31 stored in the memory 30 of the device. Therefore, when the duress message is being generated, the wireless communications device 4a inserts the correct emergency response number into the duress message 5. For example, if the device is in the United States or Canada, the duress message 5 will request that the recipient dial 911. If the device is in Mexico, the duress message 5 will ask the recipient 10 to dial 066. If the device is in the United Kingdom, the duress message 5 will request that the recipient dial 999. If the device is in France, the Netherlands or Russia, the duress message 5 tells the recipient to dial 112.

Figure 3:
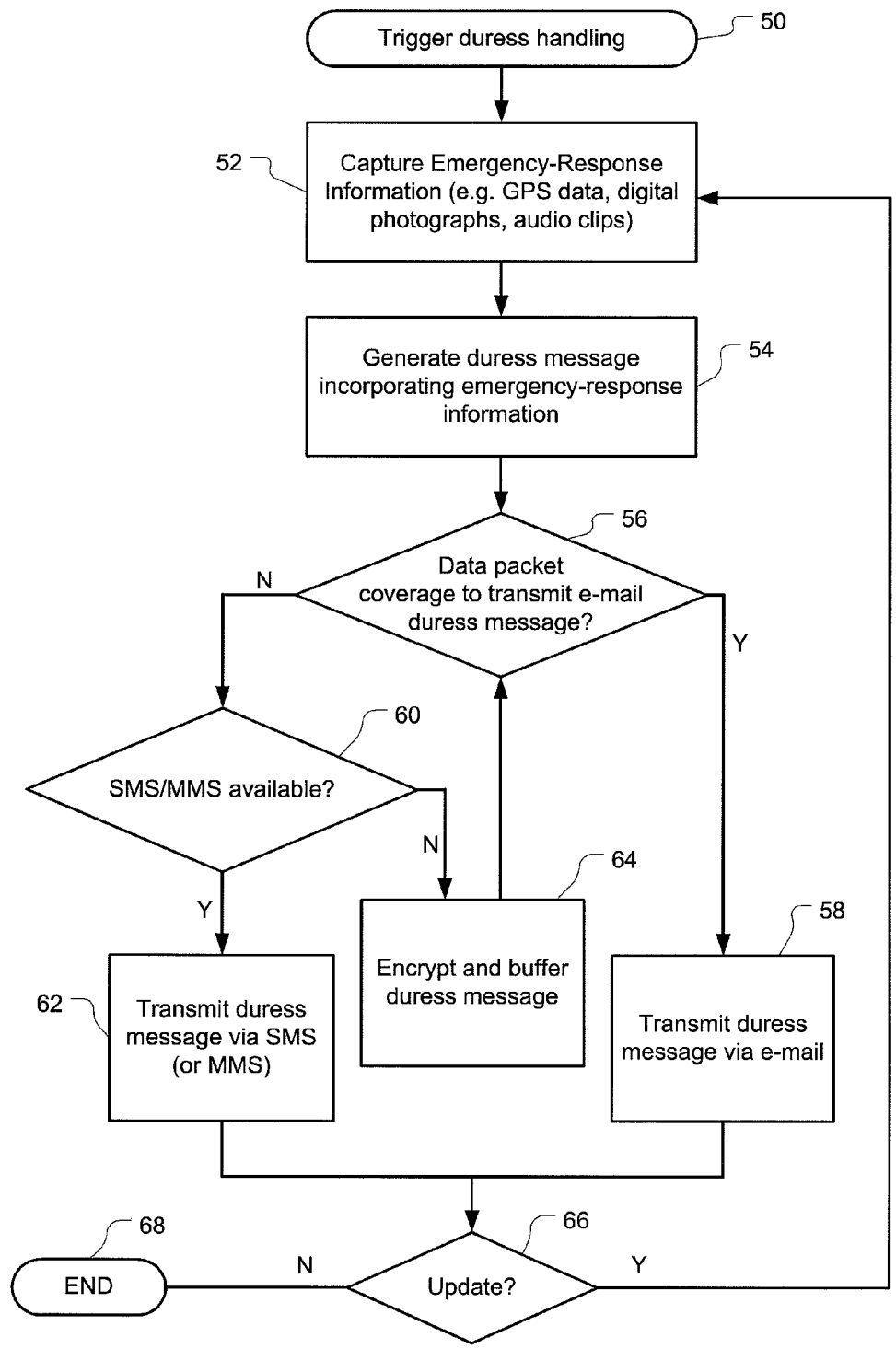
FIG. 3 is a flowchart depicting a method of handling a duress situation experienced by a user of a wireless device in accordance with embodiments of the present technology.

Another aspect of the present technology provides a method of handling a duress situation experienced by a user of a wireless device. As depicted in FIG. 3, the method includes steps of enabling the user to trigger the wireless device to automatically generate a duress message for alerting a predetermined recipient that the user is in a duress situation (step 50) and capturing emergency-response information about the environment in which the device is situated (step 52). The method further includes steps of automatically incorporating the emergency-response information into the duress message (step 54) and then automatically transmitting the duress message to the recipient (step 58).

In one embodiment, as shown in FIG. 3, the method further includes the step of determining whether data packet coverage is available for transmitting the duress message via e-mail (step 56) or another suitable data message. If the device determines that data packet communication is possible, it then proceeds to transmit the duress message via e-mail (step 58). Otherwise, if no data packet coverage is available, the device will determine whether an alternate mode of communication is available, such as, for example, SMS or MMS (step 60). If SMS or MMS is available, the device will transmit the duress message via SMS or MMS (step 62). If SMS or MMS is unavailable (and no other mode of communication is available), the device will store (or "buffer") the duress message or, preferably, both encrypt and store the duress message (step 64) until at least one mode of communication is restored, at which point the device will transmit the delayed duress message.

In one embodiment, the device detects whether the wireless transceiver (RF section 28) is on or off. If the RF section 28 is off, then the device automatically and surreptitiously turns it on. In another embodiment, the device will prevent the assailant from turning off the wireless transceiver/RF section. This can be accomplished by "faking" that the RF section has been successfully turned off by showing on the display of the device that the RF section is off while in fact the device is surreptitiously still on and transmitting.

As shown in FIG. 3, after the step of encrypting and storing the duress message (step 64), the method loops back to periodically reassess whether e-mail coverage is available (step 56), and if not whether SMS/MMS coverage is available (step 60). If either one of these modes of communication is available, the device transmits the duress message (either by e-mail at step 58 or by SMS/MMS at step 62). If none of the modes of communication is available, the device continues to store the duress message.

As further depicted in FIG. 3, the method can include a further step (step 66) of updating the emergency-response information by capturing fresh photos, audio clips and/or GPS data and sending the updated information in a follow-up duress message. If the duress situation is over, then the user can instruct the device to cease generating and transmitting further duress message, i.e. to end the duress handling (step 68). For example, this could be done by a voice call to the monitoring station or to the wireless service provider to inform them that the user is no longer in the duress situation.

Figure 4:
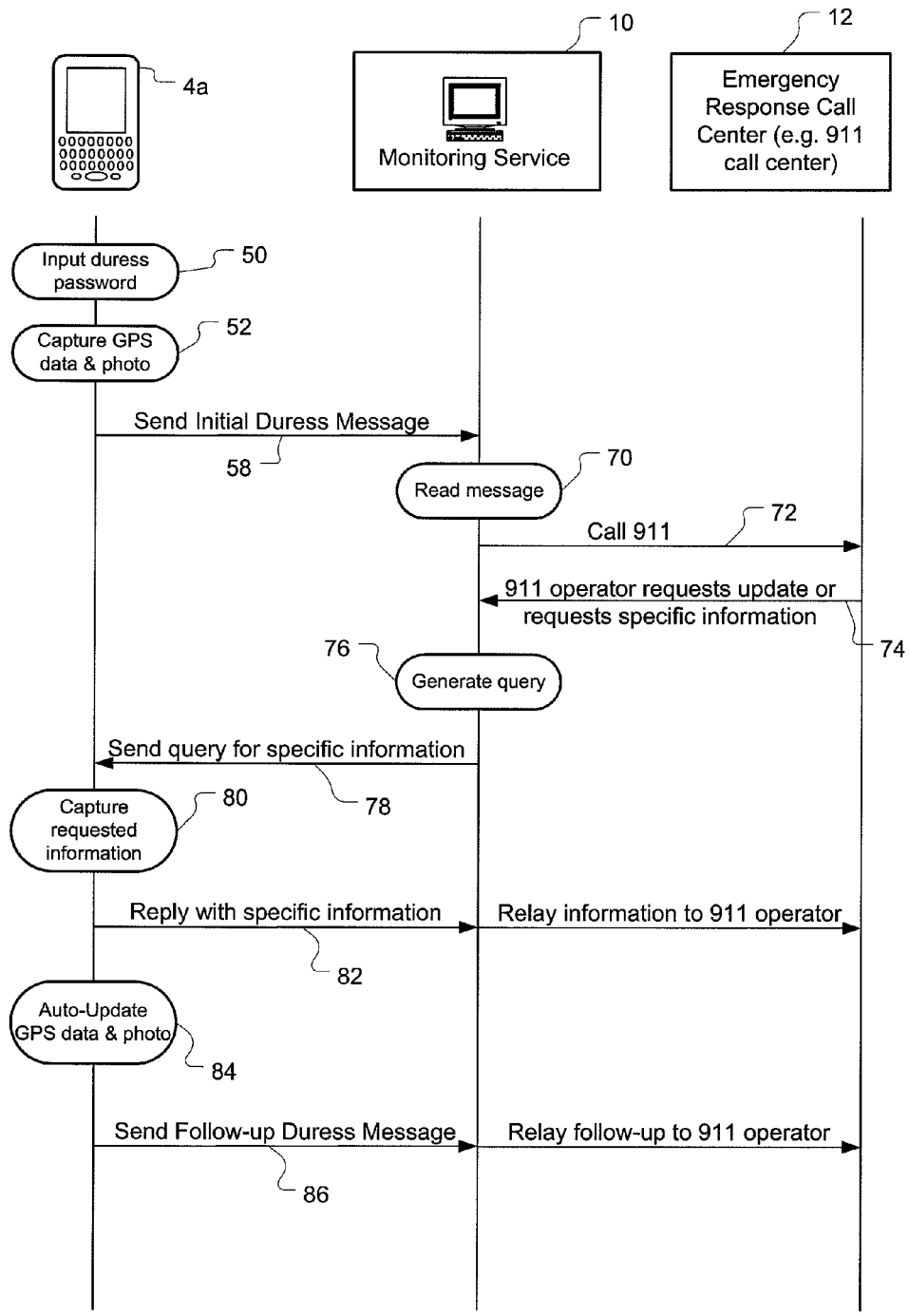
FIG. 4 is a schematic illustration of the interaction between a wireless device, a monitoring service and an emergency-response call center in accordance with embodiments of the present technology.

FIG. 4 is a schematic illustration of the interaction ("duress conversation") between the wireless communications device 4a, the monitoring service 10 and the emergency-response call center 12 in accordance with embodiments of the present technology. In the scenario depicted in FIG. 4, when a user inputs a duress password to trigger the generation and transmission of a duress message (step 50), the device (at step 52) automatically captures emergency-response information (e.g. GPS data and/or a digital photo and optionally also an audio clip). The wireless communications device 4a then sends the initial duress message (step 58) to the monitoring service 10.

The monitoring service 10 can be a private or public entity charged with monitoring user communications for duress situations. In other words, the monitoring service 10 can be manned by corporate security personnel or by publicly-funded emergency response call center personnel (such as 911 operators in which the monitoring service 10 and the emergency response call center are effectively merged into a single entity). However, for the purposes of the scenario depicted in FIG. 4, the monitoring service 10 will be treated as a separate and distinct entity from the emergency response call center (e.g. the 911 call center). The monitoring service 10 can be implemented using a standalone application or it can be incorporated into a enterprise server administration console.

Figure 5:
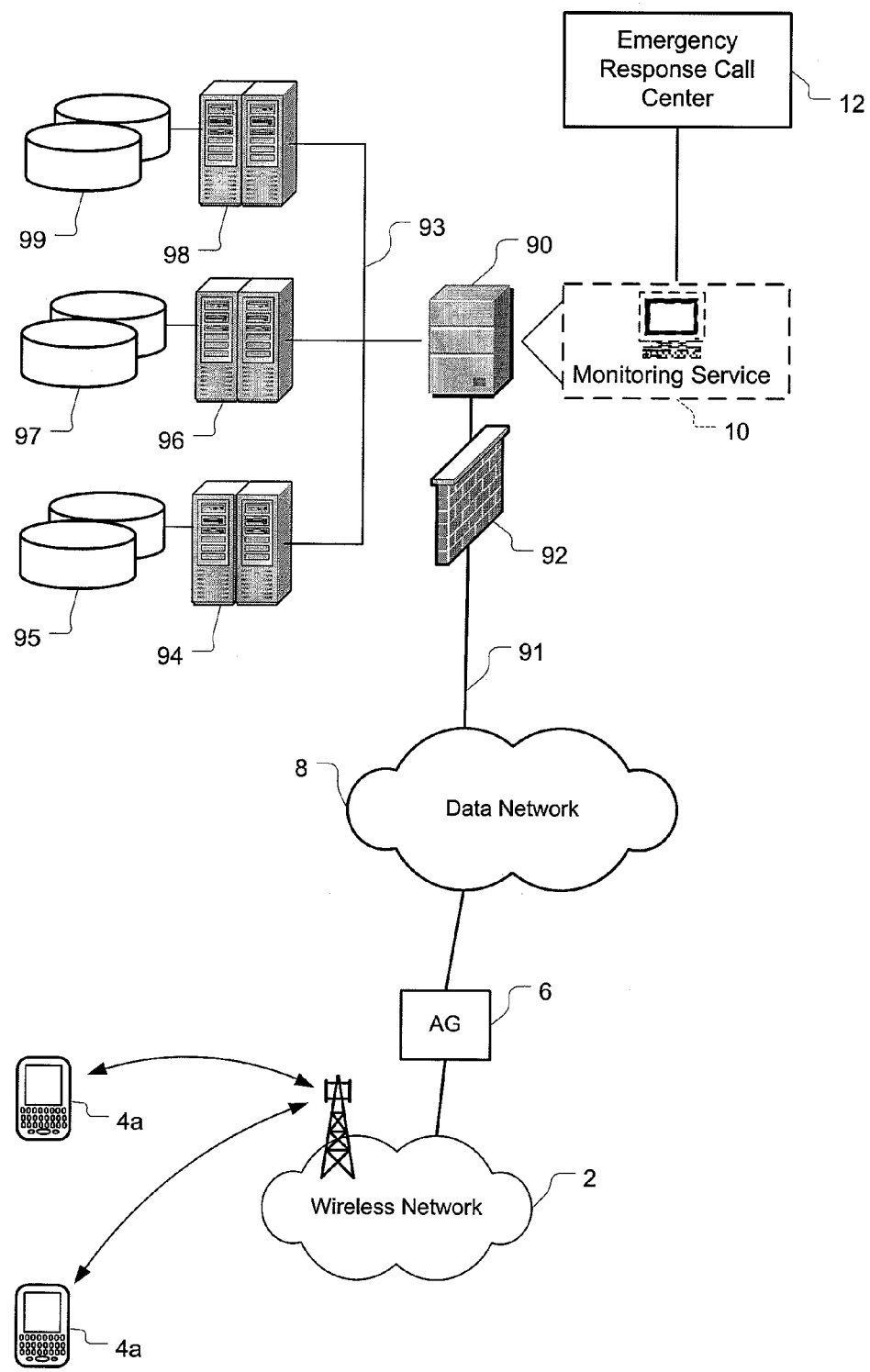
FIG. 5 is a schematic illustration of a system for monitoring communications from wireless devices to provide an emergency response to a user in a duress situation where the monitoring service is implemented using a proxy server disposed behind a firewall.

As shown in FIG. 5, the monitoring service 10 can be implemented, for example, by utilizing the BlackBerry® Mobile Data Service™ (MDS) functionality of the BlackBerry Enterprise Server™ 90. Installed behind a firewall 92, MDS acts as a proxy server or wireless gateway by providing a "secure pipe" to establish HTTP connections (using TCP/IP) over the same secure channel as is used for wireless e-mail. In one embodiment, the monitoring service 10 can be incorporated within the MDS on the BlackBerry Enterprise Server 90. Alternatively, the monitoring service 10 can be a server separate from the BES 90. In either case, the monitoring service 10 operates independently pre-existing MDS and BES functionalities that enable wireless devices to establish secure HTTP, HTML and WML connections with a web server 94 and its database 95, to establish secure HTTP and XML connections with an application server 96 and its database 97, and to establish secure SOAP/HTTP and XML connections with an applications server 98 with web services and its database 99.

Accordingly, the MDS/BES server can be modified to incorporate monitoring capabilities, i.e. the BES server can be modified to be a "monitoring service server" for hosting a monitoring service for monitoring one or more duress messages transmitted by one or more wireless communications devices. In this embodiment, the monitoring service server includes an external data connection 91 through the firewall 92 to an external data network 8 to which one or more wireless networks 2 hosting the one or more wireless communications devices 4a are connected. In this embodiment, the monitoring service server 90 also includes at least one internal data connection to one or more respective applications servers (or web servers) 94, 96, 98 disposed behind the firewall 92 to which the wireless communications devices 4a can establish secure connections through the firewall 92 and monitoring service server 90. A monitoring service application executing on the monitoring service server 90 filters data transiting the monitoring service server 90 to detect a duress message containing emergency-response information about the environment in which the wireless communications device 4a transmitting the duress message is situated. In one embodiment, the monitoring service server 90 automatically establishes a communication link (e.g. a voice call) with the emergency response call center 12. In another embodiment, the monitoring service server 90 transmits a query to the wireless communications device 4a to request that the device surreptitiously obtain and respond with specific information (e.g. at the behest of the emergency response call center or directly from police or other emergency response authorities).

Returning now to FIG. 4, when the monitoring service 10 receives the duress message, the duress message is read (step 70) either by a human operator or by an application capable of processing the information contained in the duress message. The monitoring service 10 then contacts the emergency response call center 12, preferably by dialing 911 (or the national emergency response number) at step 72. This usually entails a voice call by a human operator (corporate security personnel) to the 911 operator to notify the 911 operator that a user is under a duress situation, and to provide the location and other relevant information from the photos and clips contained in the duress message. Alternatively, the monitoring service 10 can forward the duress message to the emergency-response call center (e.g. the 911 operator) provided that the emergency-response call center is equipped to receive e-mails. In another embodiment, the monitoring service 10 could automatically forward the duress message to the emergency-response call center 12. In yet another embodiment, the duress message could be transmitted directly to the emergency-response call center 12. However, as most emergency-response call centers are currently only equipped to deal with voice calls, the monitoring service 10 acts as an intermediary to ensure that the emergency-response information in data format is conveyed by voice to the 911 operator in the emergency-response call center.

After the 911 call has been placed by personnel at the monitoring service 10 (step 72), the 911 operator may request additional, specific information (step 74) in order to assist the police or other emergency-response personnel in responding effectively and efficiently to the duress situation. Based on this information request, the monitoring service 10 will generate an e-mail or TCP/IP-type query (step 76) to the user under duress and transmit the query (step 78) as promptly as possible using a mode of communication believed to be still operational and, failing a successful transmission using that mode, will then transmit the query using alternate modes of communication.

As depicted in FIG. 4, upon receipt of the query, the wireless communications device will capture the requested information (step 80) by obtaining new GPS coordinates, taking a new picture, obtaining a new audio clip, or capturing any other emergency-response information that the device can collect. The device then replies to the query (step 82) with a reply message containing the requested information. The monitoring service 10 can then relay the message, e.g. by forwarding the e-mail or simply reading/interpreting the contents of the message for the 911 operator (who is usually still on the line at this point).

If the duress situation endures, a multiplicity of queries and replies can be transmitted back and forth between the wireless communications device and the monitoring service, thus constituting a "duress conversation" that provides periodically updated information to the monitoring service and emergency-response units. As the duress conversation occurs automatically, silently and invisibly, no input or response from the user of the wireless device is required. As the duress messages do not appear in the Outbox or Sent Items folders of the e-mail application, even if the assailant were to gain access to the e-mail application, he would not be able to find or interfere with the duress message transmissions. Furthermore, the processor would not allow the assailant to reformat, delete, overwrite or otherwise disable the operating system, GPS module, camera, microphone, e-mail application or any of the other applications or onboard modules that are used to implement this enhanced duress handling.

As further depicted in FIG. 4, the device will periodically send a follow-up duress message containing fresh, updated emergency-response information. Note this follow-up message is automatically generated after a predetermined interval of time (and is thus not a reply to the query from the 911 operator). To generate the follow-up duress message, the device captures new emergency-response information (step 84) and sends this emergency-response information (step 86) via e-mail or via an alternate mode of communication if e-mail is not operational at that time.

The capture and transmission in a duress message of emergency-response information about the environment in which the device is situated thus enables a predetermined, designated recipient to coordinate an emergency response to the duress situation or to contact an emergency-response call center (e.g. a 911 operator) in order to dispatch police or other emergency-response units to rescue the user of the wireless device. Accordingly, a wireless device having this enhanced duress handling provides greater personal security for the user.

The method steps can be stored on a computer program product having code adapted to perform the steps of the method when the computer program product is loaded into memory and executed on the processor of the wireless communications device.

The specific embodiments and implementations of the technology described above are intended to be exemplary only. The scope of the exclusive right sought is therefore intended to be limited solely by the appended claims.

The invention claimed is:

1. A method performed by a wireless communications device, the method comprising:
    detecting a trigger event;
    in response to detecting the trigger event, generating a message addressed to a predetermined recipient, the message being generated by automatically inserting predetermined text requesting that the recipient call an emergency number specified in the text wherein the emergency number is determined by identifying a country in which the wireless communications device is currently located and inserting the emergency number into the message;
    capturing emergency-response information about the environment in which the wireless communications device is situated;
    incorporating the emergency-response information into the message;
    transmitting the message to the predetermined recipient when at least one mode of communication is available; and
    when all modes of communication are unavailable, storing the message locally in a memory hidden from access until at least one mode of communication becomes available.

2. The method as claimed in claim 1 wherein capturing the emergency-response information comprises:
    obtaining Global Positioning System (GPS) data using a GPS device.

3. The method as claimed in claim 1 wherein capturing the emergency-response information comprises:
    taking a digital photograph using a digital camera within the wireless device; and
    transmitting the digital photograph with the message.

4. The method as claimed in claim 3 wherein taking a digital photograph comprises:
    disabling a camera flash on the digital camera; and
    disabling all visual indicators on the device that indicate that a digital photograph is being taken.

5. The method as claimed in claim 1 wherein capturing the emergency-response information comprises:
    recording a digital audio clip using a microphone embedded within the device; and
    transmitting the digital audio clip with the message.

6. The method as claimed in claim 1 wherein transmitting the message comprises transmitting an e-mail message over a data packet network.

7. The method as claimed in claim 6 further comprising transmitting the message using an alternate mode of communication that includes SMS or MMS when the data packet network is unavailable.

8. The method as claimed in claim 1 further comprising encrypting the message prior to the message being stored locally.

9. The method as claimed in claim 1 further comprising transmitting a subsequent message to the predetermined recipient to provide updated emergency-response information.

10. The method as claimed in claim 1 further comprising:
    receiving a query containing a request for further information;
    obtaining further information in response to receiving the query; and
    transmitting the further information to the predetermined recipient.

11. A wireless communications device comprising:
    an input device to receive a trigger event;
    a processor to generate a message for alerting a predetermined recipient, the message being generated by automatically inserting predetermined text requesting that the recipient call an emergency number specified in the text, wherein the emergency number is determined by identifying a country in which the wireless communications device is currently located and inserting the emergency number into the message;
    wherein the processor is configured to direct the wireless communications device to capture emergency-response information about the environment in which the wireless communications device is situated and to instruct an application executing on the wireless communications device to incorporate the emergency-response information into the message,
    wherein the processor is configured to:
    transmit the message to the predetermined recipient when at least one mode of communication is available and
    when all modes of communication are unavailable, store the message locally in a memory hidden from access until at least one mode of communication becomes available.

12. The wireless communications device as claimed in claim 11 comprising a digital camera for capturing a digital picture for transmitting the message.

13. The wireless communications device as claimed in claim 11 comprising a GPS device for capturing position data for transmission in the message.

14. The wireless communication device as claimed in claim 11 wherein the processor is further configured to:

receive a query containing a request for further information;

obtain further information in response to receiving the query; and transmit the further information to the predetermined recipient.

15. A non-transitory computer-readable medium to be executed on a wireless device, the computer-readable medium comprising code adapted to cause the wireless device to:

receive an event trigger;

generate a message for transmission to a predetermined recipient, the message being generated by automatically inserting predetermined text requesting that the recipient call an emergency number specified in the text, wherein the emergency number is determined by identifying a country in which the wireless communications device is currently located and inserting the emergency number into the message;

capture emergency-response information about the environment in which the wireless device is situated;

incorporate the emergency-response information into the message, and transmit the message to the predetermined recipient when at least one mode of communication is available; and store the message locally in a memory hidden from access when all modes of communication are unavailable until at least one mode of communication becomes available.

* * * * *